June 11, 1929.  E. S. WHITTIER  1,716,608

METHOD OF TUBE MANUFACTURE

Filed Nov. 27, 1926

INVENTOR.
Elmer S. Whittier
BY
Edward C. Taylor
ATTORNEY.

Patented June 11, 1929.

1,716,608

UNITED STATES PATENT OFFICE.

ELMER S. WHITTIER, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF TUBE MANUFACTURE.

Application filed November 27, 1926. Serial No. 151,029.

My invention relates to the manufacture of tubes such as inner tubes for pneumatic tire casings, especially in regard to the incorporation of valve pads made up of a desired combination of rubber and fabric parts.

The principal object of this invention is to provide a means of positively eliminating any air or gas that may have been trapped around the valve pad during the rolling of the tube about the mandrel upon which it is made.

It is customary to make inner tubes by wrapping rubber stock about a mandrel and then vulcanizing the rubber while so wrapped upon the mandrel. In order that the tube may be reinforced at that portion through which the valve is to be positioned, it is necessary to provide a pad comprising several plies of rubberized fabric. This pad becomes incorporated with the tube during vulcanization and becomes a part thereof. Heretofore, many tubes have been spoiled because of air or gas being trapped about the edges of the valve pad, the heat created during the vulcanization causing this air or gas to expand, and this in turn causing open seams around the edge of the pad and along the length of the tube. It is also customary in the manufacture of inner tubes, to use a pair of paper transfers for marking the tubes, one transfer used for the name and size of the tube, and the other transfer, a smaller one, for the serial number of the tube. It is the purpose of my invention to use one or the other or both of the transfers to eliminate the open seams in tubes.

My invention calls for but a slight departure from the usual practise in building tubes, but, although slight, it removes a serious defect found in the former practise. My invention will be described with reference to the accompanying drawings; in which, Fig. 1 is a plan view, partly broken away, indicating the tube parts just prior to being rolled about a tube forming mandrel;

Figure 5:
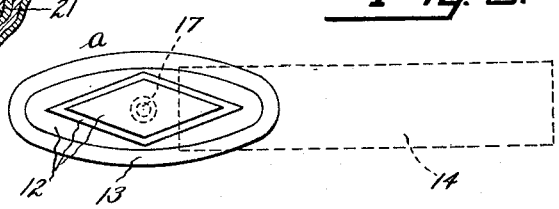
Fig. 5 is a plan view of a valve pad.

In carrying out my invention, a usual rubber sheet 10, preferably made up of two thin laminated sheets, is rolled about a mandrel 11 two or more times. A valve pad $a$ is placed a short distance back from the front edge of the material 10. Although this pad $a$ may be made in a varied number of forms, the preferred form is shown in Fig. 5, where a number of layers of fabric 12 are laid in pyramid form upon a thin piece of rubber tube stock 13. Although Fig. 5 for clearness in illustration shows the pad with the layers of fabric uppermost, the pad $a$ should be placed in such a manner on the tube material so that the piece of tube stock 13 is uppermost, the layers of fabric 12 lying between this tube stock 13 and the material 10. Upon the vulcanization of the tube, the tube stock 13 will blend perfectly with the tube material 10.

Figure 1:
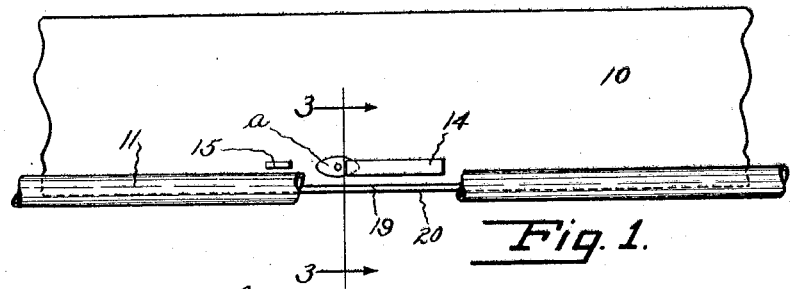
Figure 2:
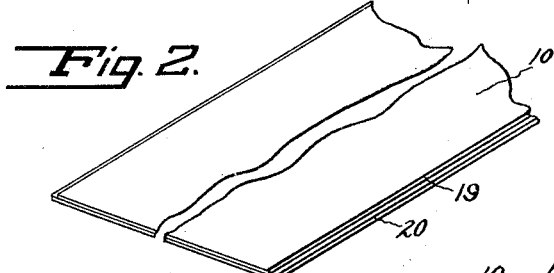
Fig. 2 is a perspective view of the rubber stock made up of two laminated sheets of material.
Figure 3:
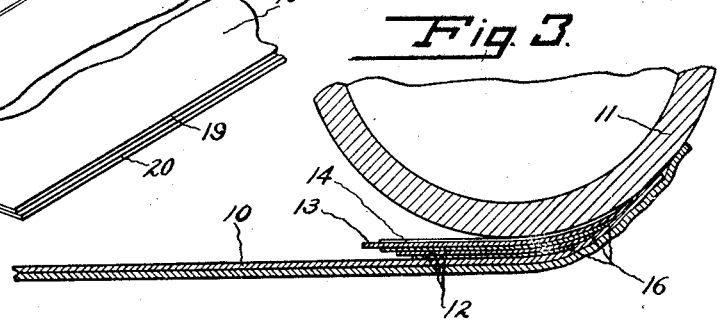
Fig. 3 is a cross-section taken through the line 3—3 of Fig. 1, showing in detail a valve pad and a transfer.
Figure 4:
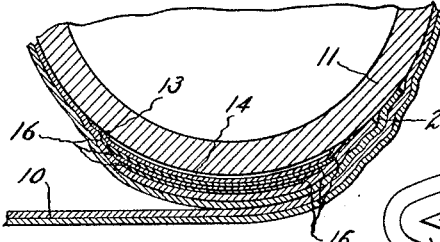
Fig. 4 is a view similar to Fig. 3 after approximately one revolution of the stock about the mandrel.

In marking a tube with the name of the manufacturer, size of the tube, etc., it is customary to use a paper transfer 14 that will leave the desired marking on the tube. Another transfer 15 is usually added to supply the serial number of the tube and is ordinarily placed alongside the larger transfer 14 as shown in Fig. 1. However, as the exact location of the transfers is not important, I prefer to place the large transfer 14 over the valve pad $a$ as shown in Figs. 1, 3, and 4, and indicated by the dotted lines in Fig. 5. One end of the transfer lies over the pad $a$ far enough from the center of the pad so as to be out of the way of the hole that is later punched through the center of the pad and tube for the insertion of the valve. Although I have shown the transfer 14 lying parallel to the edge of the material, it may be placed at any angle from the pad $a$, this angle depending on how the tube marking is desired. The principal reason for locating the transfer as shown will now be explained.

After locating the pad $a$ and the transfers 14 and 15 upon the sheet of material 10, the mandrel 11 is placed along the edge of the material as shown in Figs. 1 and 3 and rolled, thereby wrapping the rubber about it, Fig. 4 showing an intermediate step. During the rolling, pockets 16 are formed by the stepped-off edges of the layers of fabric 12 because of insufficient pressure around the valve pad, these pockets holding air which, if not removed, will cause open seams as described.

Figure 6:
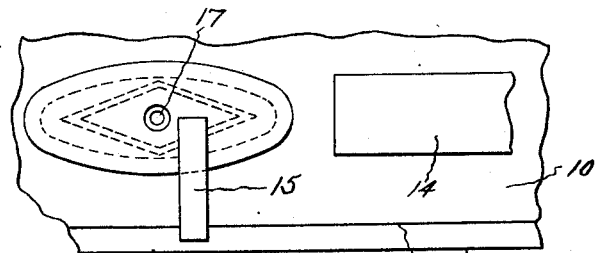
Fig. 6 is an enlarged cross-section of a valve pad and tube on a mandrel during the vulcanization of the pad and tube.

The trapped air will remain in the pockets 16 until the vulcanization of the tube before which, however, the ends of the tube are tightly sealed to the mandrel by a cuff, by being wrapped, or by any other method. The heat of the subsequent vulcanization will cause the trapped air to expand, this air, due to the vulcanizing pressure, being forced along the cords of the fabric layers 12 of the valve pad $a$ into a recess 17 cut through the tube material 13 and through one or more layers of fabric 12 of the pad $a$. The continually expanding air will tend to force the pad $a$ away from the mandrel 11 and form a recess 18 (Fig. 6). Not adhering to the mandrel as much as the tacky rubber stock 10, the transfer 14 will allow the air to pocket itself between the said transfer and the mandrel 11. This diffuses the air from a comparatively small area about the pad $a$ over a large area formed between the transfer 14 and the mandrel 11. The diffusion of the air reduces the intensity of its effect, and the injurious effect of its presence under the paper transfer is much less than the presence of an equivalent amount under a similar area of rubber.

Figure 7:
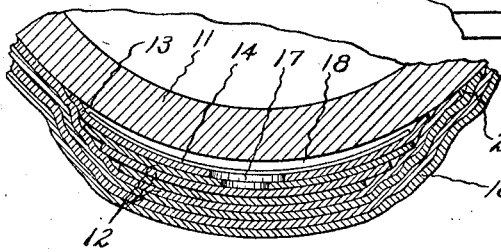
Fig. 7 is a modification.

Although the above disclosure is my preferred method, I can also use the smaller transfer to accomplish the same purpose in practically the same manner. Here I place the larger transfer 14 at some part of the material other than over the pad $a$ and locate the smaller transfer 15 so that one end comes to approximately the center of the pad while the other end lies between the edges 19 and 20 of the laminated sheets of material 10 (Fig. 7). In this case, the expanding air from about the pad $a$ will seep out through the vent formed by the transfer 15 into the seam 21 from which it is diffused. The trapped air about the pad, if not drawn off would be confined to a comparatively small area and cause open seams in the tube stock whereby this same air, if diffused over a large area as is accomplished by my invention, will not be noticeable.

A combination of the two methods disclosed above, also produces a very satisfactory result. In this case, the trapped air will have two paths of escape.

Having thus described my invention, I claim:

1. A method of making a rubber tube of the type having a fabric laminated valve pad embedded in the rubber tube material, which consists in venting the valve pad to a point remote from the pad, and vulcanizing the pad and tube together.

2. A method of manufacturing an inner tube for tire casings which consists in placing a valve pad on rubber tube material, locating a paper transfer strip partially across the valve pad, rolling the whole about a mandrel, and vulcanizing the pad and tube together.

3. A method of making a rolled rubber tube of the type having a fabric laminated valve pad embedded in the rubber tube material, which consists in venting the valve pad into the longitudinal seam formed by the rolling of the tube, and vulcanizing the pad and tube together.

4. A method of manufacturing an inner tube for tire casings which consists in locating a valve pad on rubber tube material, locating a paper transfer strip across the valve pad toward the edge of the tube material, rolling the whole about a mandrel, and vulcanizing the pad and tube together.

5. A method of manufacturing an inner tube for tire casings which consists in placing a valve pad on rubber tube material, locating a paper transfer strip partially across the valve pad to form a pocket, locating another transfer strip across the valve pad toward the edge of the tube material to form a vent into the longitudinal seam formed by the rolling of the tube, rolling the whole about a mandrel, and vulcanizing the pad and tube together.

ELMER S. WHITTIER